US012599885B2

(12) United States Patent
Shaner et al.

(10) Patent No.: US 12,599,885 B2
(45) Date of Patent: Apr. 14, 2026

(54) METHODS OF PNEUMATIC CARBON REMOVAL

(71) Applicant: MOLTEN INDUSTRIES INC., Oakland, CA (US)

(72) Inventors: Samuel Shaner, Goleta, CA (US); Zachary Jones, Goleta, CA (US); Andrew Caldwell, Goleta, CA (US); Fadl Saadi, Goleta, CA (US)

(73) Assignee: MOLTEN INDUSTRIES INC., Oakland, CA (US)

( * ) Notice: Subject to any disclaimer, the term of this patent is extended or adjusted under 35 U.S.C. 154(b) by 678 days.

(21) Appl. No.: 17/906,108

(22) PCT Filed: Mar. 12, 2021

(86) PCT No.: PCT/US2021/022220
§ 371 (c)(1),
(2) Date: Sep. 12, 2022

(87) PCT Pub. No.: WO2021/183959
PCT Pub. Date: Sep. 16, 2021

(65) Prior Publication Data
US 2023/0099516 A1     Mar. 30, 2023

Related U.S. Application Data

(60) Provisional application No. 62/989,016, filed on Mar. 13, 2020.

(51) Int. Cl.
*B01J 10/00*     (2006.01)
*B01J 6/00*     (2006.01)
(Continued)

(52) U.S. Cl.
CPC ............. *B01J 10/005* (2013.01); *B01J 6/008* (2013.01); *B01J 8/0055* (2013.01); *B01J 8/006* (2013.01);
(Continued)

(58) Field of Classification Search
CPC ........ B01J 10/005; B01J 6/008; B01J 8/0055; B01J 8/006; B01J 8/007; B01J 8/224; C01B 32/05
See application file for complete search history.

(56) References Cited

U.S. PATENT DOCUMENTS

| | | | |
|---|---|---|---|
| 1,756,877 A | 4/1930 | Paris, Jr. | |
| 2,760,847 A * | 8/1956 | Boedeker .................. | C09C 1/54 422/150 |

(Continued)

FOREIGN PATENT DOCUMENTS

| | | |
|---|---|---|
| WO | 2016079122 A1 | 5/2016 |
| WO | 2019099795 A1 | 5/2019 |

(Continued)

OTHER PUBLICATIONS

International Preliminary Report on Patentability dated Sep. 22, 2022, PCT/US2021/022220 filed on Mar. 21, 2021.
(Continued)

*Primary Examiner* — Matthew J Merkling
(74) *Attorney, Agent, or Firm* — Asif Ghias

(57) ABSTRACT

A pyrolysis process comprises introducing one or more chemical reactants into a reactor containing a liquid maintained at a high temperature, producing chemical products in the liquid based on the high temperature, allowing the solid product to grow in particle size, accumulating the solid product in the liquid, and removing the solid product from the reactor while retaining a substantial portion of the liquid
(Continued)

within the reactor. The chemical products comprise a solid chemical product that is mixed with the liquid.

21 Claims, 14 Drawing Sheets

(51) Int. Cl.

| | | |
|---|---|---|
| *B01J 8/00* | (2006.01) | |
| *B01J 8/22* | (2006.01) | |
| *C01B 32/05* | (2017.01) | |

(52) U.S. Cl.
CPC .............. *B01J 8/007* (2013.01); *B01J 8/224* (2013.01); *C01B 32/05* (2017.08)

(56) References Cited

U.S. PATENT DOCUMENTS

| | | | | |
|---|---|---|---|---|
| 4,823,712 | A | 4/1989 | Wormer | |
| 5,603,825 | A | 2/1997 | Costinel | |
| 11,897,768 | B2 | 2/2024 | Ashton | |
| 2007/0121294 | A1 | 5/2007 | Campbell | |
| 2008/0307703 | A1 | 12/2008 | Dietenberger | |
| 2011/0056240 | A1 | 3/2011 | Malik | |
| 2012/0227405 | A1 | 9/2012 | Bruce | |
| 2013/0075348 | A1 | 3/2013 | Ylikangas | |
| 2014/0335008 | A1 | 11/2014 | Kim | |
| 2015/0059571 | A1 | 3/2015 | Denton | |
| 2015/0306520 | A1 | 10/2015 | Grave | |
| 2016/0189806 | A1 | 6/2016 | Cheatham, III | |
| 2017/0217772 | A1* | 8/2017 | Stiller | B01J 27/22 |
| 2017/0240421 | A1 | 8/2017 | Erlebacher et al. | |
| 2017/0276430 | A1 | 9/2017 | Cooper | |
| 2019/0055173 | A1* | 2/2019 | Desai | C22C 38/00 |
| 2019/0375633 | A1 | 12/2019 | Oconnor | |
| 2020/0071162 | A1 | 3/2020 | Gupta et al. | |
| 2020/0071164 | A1 | 3/2020 | Gupta et al. | |
| 2021/0061654 | A1 | 3/2021 | McFarland | |
| 2023/0007896 | A1 | 1/2023 | Saadi | |
| 2023/0322559 | A1 | 10/2023 | Parkinson | |
| 2025/0144548 | A1 | 5/2025 | Shaner et al. | |

FOREIGN PATENT DOCUMENTS

| | | | | |
|---|---|---|---|---|
| WO | 2019197253 | A1 | 10/2019 | |
| WO | 2019226416 | A1 | 11/2019 | |
| WO | WO-2020161192 | A1 * | 8/2020 | B01D 53/047 |
| WO | 2021113708 | A1 | 6/2021 | |
| WO | 2021183959 | A1 | 9/2021 | |
| WO | 2022047156 | A1 | 3/2022 | |
| WO | 2023147377 | A2 | 8/2023 | |

OTHER PUBLICATIONS

International Search Report and Written Opinion dated May 27, 2021, PCT/US2021/022220 filed on Mar. 21, 2021.
Rahimi, et al. "Solid carbon production and recovery from high temperature methane pyrolysis in bubble columns containing molten metals and molten salts" Carbon, vol. 151 (May 17, 2019): pp. 181-191; entire document.

Office Action dated May 30, 2025, U.S. Appl. No. 17/782,846, filed Jun. 6, 2022.
International Search Report and Written Opinion dated Feb. 1, 2021, PCT/US2020/063406, filed on Dec. 4, 2020.
International Preliminary Report on Patentability dated Jun. 16, 2022, PCT/US2020/063406, filed on Dec. 4, 2020.
Rule 161/162 Communication dated Jul. 13, 2022, EP Application No. 20895721.7, filed on Apr. 25, 2022.
European Extended Search Report dated Oct. 31, 2024, EP Application No. 20895721.7, filed on Apr. 25, 2022.
Japanese Office Action dated Jan. 14, 2025, JP Application No. 2022-532591, filed May 30, 2022.
Restriction Requirement dated Mar. 21, 2025, U.S. Appl. No. 17/782,846, filed Jun. 6, 2022.
Rule 161/162 Communication dated Oct. 20, 2022, EP Application No. 21768755.7, filed on Aug. 31, 2022.
European Extended Search Report dated Mar. 4, 2025, EP Application No. 21768755.7, filed on Aug. 31, 2022.
Partial Search Report and Written Opinion dated Oct. 12, 2021, PCT/US2021/047952 filed on Aug. 27, 2021.
International Search Report and Written Opinion dated Jan. 5, 2022, PCT/US2021/047952 filed on Aug. 27, 2021.
International Preliminary Report on Patentability dated Mar. 9, 2023, PCT/US2021/047952 filed on Aug. 27, 2021.
Partial International Search Report dated Apr. 19, 2023, PCT/US2023/061295 filed Jan. 25, 2023.
International Search Report and Written Opinion dated Jul. 18, 2023, PCT/US2023/061295, filed Jan. 25, 2023.
International Preliminary Report on Patentability dated Aug. 8, 2024, PCT/US2023/061295, filed Jan. 25, 2023.
Kang, et al., "Catalytic methane pyrolysis in molten MnCl2-KCl" Applied Catalysis B: Environmental, vol. 254 (May 7, 2019); pp. 659-666.
Li, et al., "Entropy generation rate minimization for steam methane reforming reactor heated by molten salt" Energy Reports, vol. 6 (Mar. 18, 2020); pp. 685-697.
Parkinson, Brett, et al., "Hydrogen production using methane: Techno-economics of decarbonizing fuels and chemicals," International Journal of Hydrogen Energy, vol. 43, No. 5, Feb. 1, 2018 (Feb. 1, 2018), pp. 2540-2555, XP055639731, Amsterdam, NL ISSN: 0360-3199, DOI: 10.1016/j.ijhydene.2017.12.081, p. 2544-p. 2545; figure 3.
Upham, D Chester, et al., "Catalytic molten metals for the direct conversion of methane to hydrogen and separable carbon," Science (New York, N.Y.), Nov. 17, 2017 (Nov. 17, 2017), pp. 917-921, XP055609409, United States, DOI: 10.1126/science.aao5023 Retrieved from the Internet: URL:https://science.sciencemag.org/content/sci/358/6365/917.full.pdf.
Saadi, Fadl, et al., entitled, "Molten Salt Reactor Improvements," U.S. Appl. No. 62/944,819, filed Dec. 6, 2019.
Shanner, Samuel, et al., entitled, "Methods of Pneumatic Carbon Removal," U.S. Appl. No. 62/989,016, filed Mar. 20, 2020.
Parkinson, Brett, et al., entitled, "Carbon Separation and Removal From Molten Media, " U.S. Appl. No. 63/071,857, filed Aug. 28, 2020.
Shanner, Samuel, et al., entitled, "Continuous Separation of Multiphase Mixtures," U.S. Appl. No. 63/302,843, filed Jan. 25, 2022.
Shanner, Samuel, et al., entitled, "Continuous Separation of Multiphase Mixtures," U.S. Non- U.S. Appl. No. 18/832,606, filed Jul. 24, 2024.

* cited by examiner

FIG. 5B

METHODS OF PNEUMATIC CARBON REMOVAL

CROSS-REFERENCE TO RELATED APPLICATIONS

This application is a filing under 35 U.S.C. 371 as the National Stage of International Application No. PCT/US2021/022220, filed on Mar. 12, 2021, entitled, "METHODS OF PNEUMATIC CARBON REMOVAL," which claims the benefit of and claims priority to U.S. Provisional Application No. 62/989,016, filed on Mar. 13, 2020, and entitled "METHODS OF PNEUMATIC CARBON REMOVAL," both of which are incorporated herein by reference in their entirety for all purposes.

STATEMENT REGARDING FEDERALLY SPONSORED RESEARCH OR DEVELOPMENT

None.

BACKGROUND

At present, industrial hydrogen is produced primarily using the steam methane reforming (SMR) process, and the product effluent from the reactors contains not only the desired hydrogen product but also other gaseous species including gaseous carbon oxides ($CO/CO_2$) and unconverted methane. Separation of the hydrogen for shipment or storage and separation of the methane for recirculation back to the reformer is carried out in a pressure swing adsorption (PSA) unit, a costly and energy-intensive separation. Generally, the carbon oxides are released to the environment. This separation process exists as an independent unit after reaction. Overall the process produces significant carbon dioxide. Natural gas is also widely used to produce power by combustion with oxygen, again producing significant amounts of carbon dioxide.

SUMMARY

In an embodiment, a pyrolysis process comprises introducing one or more chemical reactants into a reactor containing a liquid maintained at a high temperature, producing chemical products in the liquid based on the high temperature, allowing the solid product to grow in particle size, accumulating the solid product in the liquid, and removing the solid product from the reactor while retaining a substantial portion of the liquid within the reactor. The chemical products comprise a solid chemical product that is mixed with the liquid.

In an embodiment, a method comprises introducing a hydrocarbon reactant into a reactor, forming solid carbon within the reactor based on contacting the hydrocarbon reactant with the liquid reaction medium, separating the solid carbon from the liquid reaction medium on a grate in an upper connection of the reactor, and pneumatically conveying the solid carbon from the grate to remove the solid carbon from the reactor. The reactor comprises a liquid reaction medium.

In an embodiment, a method comprises introducing a hydrocarbon reactant into a reactor, forming solid carbon within the main reaction section based on contacting the hydrocarbon reactant with the liquid reaction medium, passing at least a portion of the liquid reaction medium and at least a portion of the solid carbon through an upper connection in the reactor, separating the solid carbon from the portion of the liquid reaction medium in a cyclone, and removing the solid carbon through an exit in the cyclone. The reactor comprises a liquid reaction medium.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 5B is a schematic illustration showing a chemical reactant being introduced into a reactor containing a liquid and produces a solid product. The gas stream exits the reactor containing a portion of the solid carbon product through an orifice at the top of the vessel. The gas stream passes through a cyclone separator that removes entrained carbon and exits via the vortex finder. Another inlet orifice is located at the top of the reactor. A side leg filled with stagnant liquid is present to modulate the liquid level in the reactor vessel.

DETAILED DESCRIPTION

The novel elements of this disclosure relate to chemical reactor systems for use in a high-temperature and high-pressure environment for the transformation of chemicals to gas phase and condensed phase chemical products. The various embodiments include continuous and semi-batch processes whereby carbon (e.g., solid carbon, etc.) and gas phase products can be produced from hydrocarbon gases including natural gas and then separated and removed from the reaction environment as solid carbon and gas-phase chemical co-products. In some embodiments, methane can be introduced into a high temperature molten salt and/or molten metal filled reactor to produce carbon and molecular hydrogen as chemical products. The carbon produced can be dispersed in the molten media and continuously or periodically removed from the reactor by one of several subsystems as described herein. These and other features will be more clearly understood from the following detailed description taken in conjunction with the accompanying drawings and claims.

The systems and method disclosed herein relate to producing solid and gas phase chemical products in a high temperature multi-component liquid environment and continuous or semi-batch processes for separating the solid, gas, and liquid phase components. The systems and methods also pertain to methods for concentrating and separating solid carbon produced from methane decomposition from a molten salt and/or molten metal suspension. Embodiments for both in-situ and ex-situ carbon separation from the molten media are described.

Chemical reactions producing multi-phase products including solids are common. A particular challenge in such reactions when conducted at high pressure and high temperature when solid products are produced is the separation and removal from the reactor of gas phase products and solid phase products separately. The systems and methods disclosed herein relate to how to remove the solids from the reaction environment.

Non-oxidative dehydrogenation and decomposition of substances containing hydrogen and carbon atoms (pyrolysis) has been practiced on solid catalysts. Unfortunately, solid catalysts are rapidly deactivated by carbon deposition (coked) and the removal of the carbon is difficult. Contacting these substances in a reaction environment containing a molten salt and/or molten metal at a temperature of approximately 700-1000° C. allows for decomposition of the substances to form solid carbon that is suspended in the liquid and gas phase products without coking the catalyst. The unsolved problem has been the removal of the solid carbon from the reaction environment (e.g., from the liquid phase).

Figure 1A:
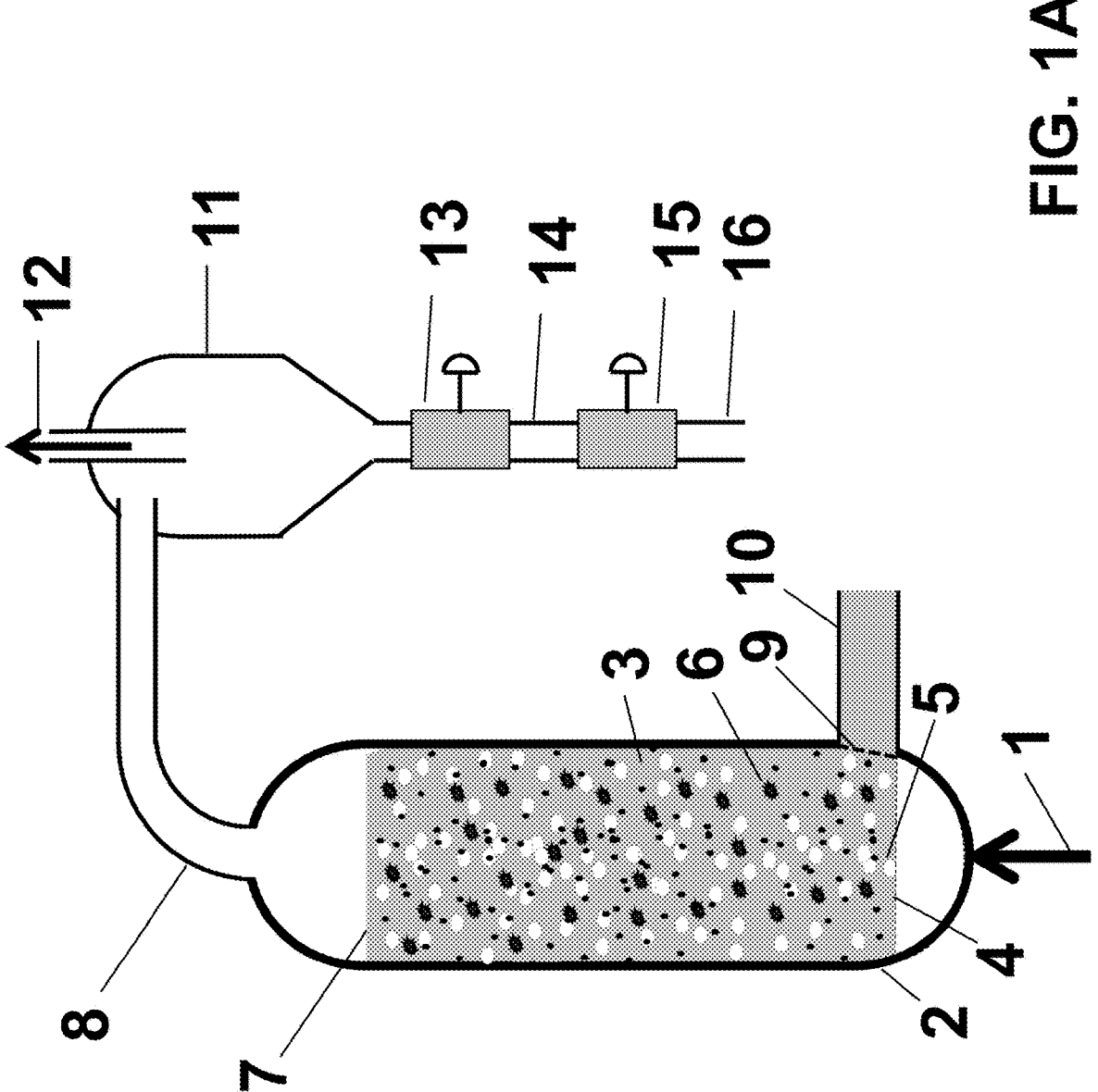
FIG. 1A is a schematic illustration showing a chemical reactant introduced into a reactor containing a liquid and produces a solid product.

To illustrate the problem reference is made to FIG. 1A. As shown, a reactant 1 can be introduced into a reactor vessel 2 maintained at high temperature and high pressure containing a liquid reaction medium 3 through a gas distribution interface 4 that forms bubbles 5, thereby allowing contact of the gas with the liquid reaction medium 3. The chemical reaction(s) occurring within the reactor produce solid products 6, which become suspended in the liquid, as well as possibly gas phase products that can leave through the gas outlet 8. Depending upon the rate of gas introduction into the reactor vessel 2 and relative densities of the solid and liquid reaction medium 3 among other properties, the solids mixed with the liquid medium 3 may remain suspended or accumulate at the top 7 or bottom of the reactor, depending on the density differences between the liquid reaction medium 3 and the solids 6. Gas phase products and unreacted feed gas can exit through an orifice at gas outlet 8 or another outlet at the top of the reactor. The gas leaving the reactor enters a cyclone separator 11 where it exits through the vortex finder 12. In some embodiments, natural gas containing mostly methane can be introduced into the reactor vessel 2 that can be maintained at a pressure between 1 and 30 bar and a temperature between 700 and 1300° C. containing a molten salt and/or molten metal and the gas phase reactant transformed into solid carbon and gaseous hydrogen. The carbon can be suspended in the molten media, and the systems and method described in more detail herein can be used to separate the two phases.

Figure 1B:
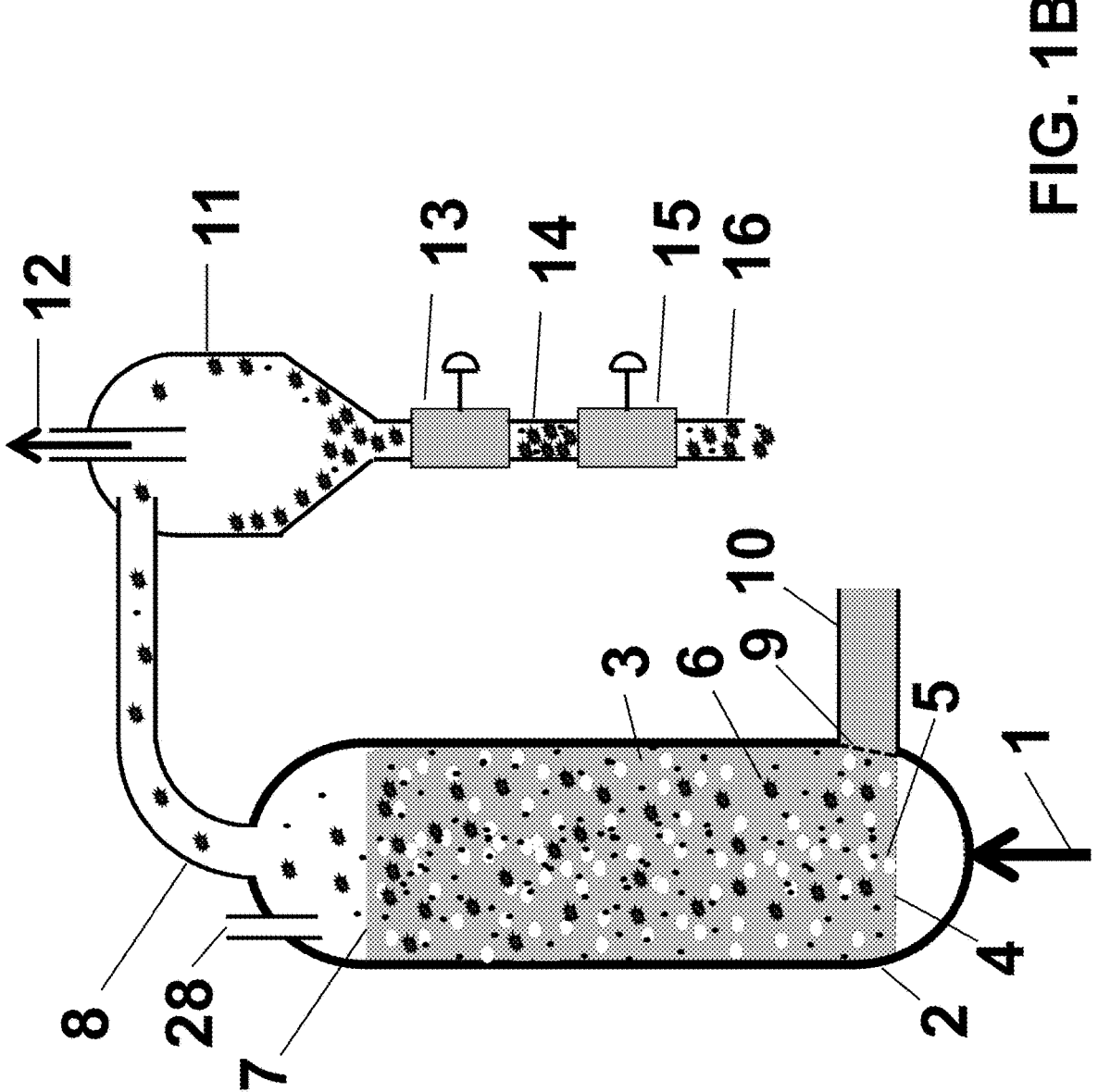
FIG. 1B is a schematic illustration showing a chemical reactant introduced into a reactor containing a liquid and produces a solid product. A portion of the carbon product is pneumatically conveyed to a gas/solid separation unit.

FIG. 1B illustrates a similar embodiment in which an auxiliary gas stream 28 can be introduced into the head space to aid in conveying solid products out of the reactor. As shown in FIG. 1A, a reactant 1 can be introduced into a reactor vessel 2 maintained at high temperature and high pressure containing a liquid reaction medium 3 through a gas distribution interface 4 that forms bubbles 5, thereby allowing contact of the gas with the liquid medium 3. The chemical reaction(s) occurring within the reactor produce solid products 6, which become suspended in the liquid, as well as possibly gas phase products that can leave through the gas outlet 8. Depending upon the rate of gas introduction into the reactor 2 and relative densities of the solid and liquid reaction medium 3 among other properties, the solids mixed with the liquid reaction medium 3 may remain suspended or accumulate at the top 7 or bottom of the reactor, depending on the density differences between the liquid medium 3 and the solids 6. A portion of the solid products can be entrained with the gas phase products. Gas phase products, unreacted feed gas, and entrained solid products can exit through an orifice at gas outlet 8 or other outlet at the top of the reactor. The auxiliary gas stream 28 can be introduced into the head space to aid in conveying solid products out of the reactor.

The flowrate of the auxiliary gas stream can be selected so that the total flowrate of the gas phase products, the unreacted feed gas, and the auxiliary gas stream is sufficient to fluidize and entrain at least a portion of the solid products. The gas leaving the reactor can enter a cyclone separator 11 where at least a portion of the solid phase products can be separated and the gas can exit through the vortex finder 12. In some embodiments, natural gas containing mostly methane can be introduced into the reactor 2 that can be maintained at a pressure between 1 and 30 bar and a temperature between 700 and 1300° C. containing a molten salt and/or molten metal and the gas phase reactant transformed into solid carbon and gaseous hydrogen. A portion of the carbon can be suspended in the molten media, and the systems and method described in more detail herein can be used to separate the two phases.

The embodiment shown in FIG. 1A may be used with a semi-batch process as described herein. In some aspects, the embodiment shown in FIG. 1B can be used in a continuous process based on the use of the auxiliary gas stream 28 to provide a desired gas phase flow rate out of the reactor vessel 2.

As disclosed herein, a high-temperature, high-pressure, three-phase separation process can be used, and the gas phase component can be disengaged from a mixture of liquid and suspended solid particles. The two condensed phases can be separated by floatation, filtration, and/or pneumatic conveying of the solids. The separation process can occur either within the reactor vessel (e.g., in-situ) or in a separate vessel (e.g., ex-situ).

Removing solid products accumulating in a liquid filled reaction environment can be challenging and difficult at high temperature and high pressure. For the chemical transformation of natural gas containing light alkanes, mostly methane, methods using molten metals and/or molten salts in bubble column reactors can pyrolyze the gas to form solid carbon and molecular hydrogen, Hz. The process operates at temperatures greater than about 700° C. and pressures greater than 1 bar. The solid carbon can accumulate in the liquid and can be concentrated at top of the reactor or, under high gas flowrates (e.g., at higher hold-ups), mixed homogeneously in the liquid. The systems and methods disclosed herein are described in connection with the concentration and separation of the solid carbon from the liquid reaction media.

A reactant gas containing molecules with carbon and hydrogen, when bubbled through high-temperature molten salts and/or molten metals, can be decomposed into solid carbon and molecular hydrogen. The solid carbon product can be suspended in the liquid media. In an embodiment shown schematically in FIGS. 1A and 1B the reaction occurs in the bubble column reactor vessel 2 at high gas holdup suspending the solid carbon in the liquid. The reactor can contain an exit stream at gas outlet 8 where gaseous products and unreacted reactants leave the system. Several embodiments are described to remove the carbon once accumulated in the liquid.

In some aspects, the process can be carried out using a single vessel, semi-batch flotation process with pneumatic conveying of the solids. Referring to FIGS. 1A and 2-4, the system demonstrates an embodiment of a process for separating the solid carbon from the liquid reaction medium 3. The system can operate as a semi-batch process, with steps schematically represented in FIGS. 1A, 2, 3, and 4, respectively. In step 1 (e.g., as shown in FIG. 1A), a hydrocarbon gas (e.g., a gas containing methane, substantially all methane, a blend of hydrocarbons, etc.) can be introduced as an inlet gas stream 1 into a reactor 2 filled with a liquid reaction medium 3. The liquid reaction medium 3 can comprise a molten salt and/or a molten metal. The hydrocarbon gas in stream 1 can pass through a gas distributor 4 to form bubbles 5 in the liquid reaction medium 3. At least a portion of the hydrocarbon gas in the bubbles 5 can be pyrolyzed to form solid carbon 6 and hydrogen gas.

The hydrocarbon gas flowrate into the reactor vessel 2 can be adjusted to attain a hold-up of between about 10% and about 40%, or approximately 20%. The hold-up refers to the amount of gas present within the liquid phase and also determines a regime of the mixing between the liquid and the gas phase in the reactor vessel 2. During the reaction phase, the hold-up can be adjusted to provide a turbulent flow regime in which the solid products can be mixed within the liquid reaction medium 3. The hydrogen, unreacted hydrocarbon (e.g., methane, etc.) remaining in the gas phase, and a portion of the solid product can be disengaged at the liquid surface 7 and exit through an orifice as an exit gas stream at gas outlet 8 at the top of the reactor vessel 2. In some aspects such as shown in FIG. 1B, an auxiliary gas stream 28 can be introduced into the head space to aid in conveying solid products out of the reactor. The gas and entrained solids leaving the reactor can be transported to a cyclone 11 where at least a portion of the carbon can be separated while the gas exits through the vortex finder 12.

Figure 2:
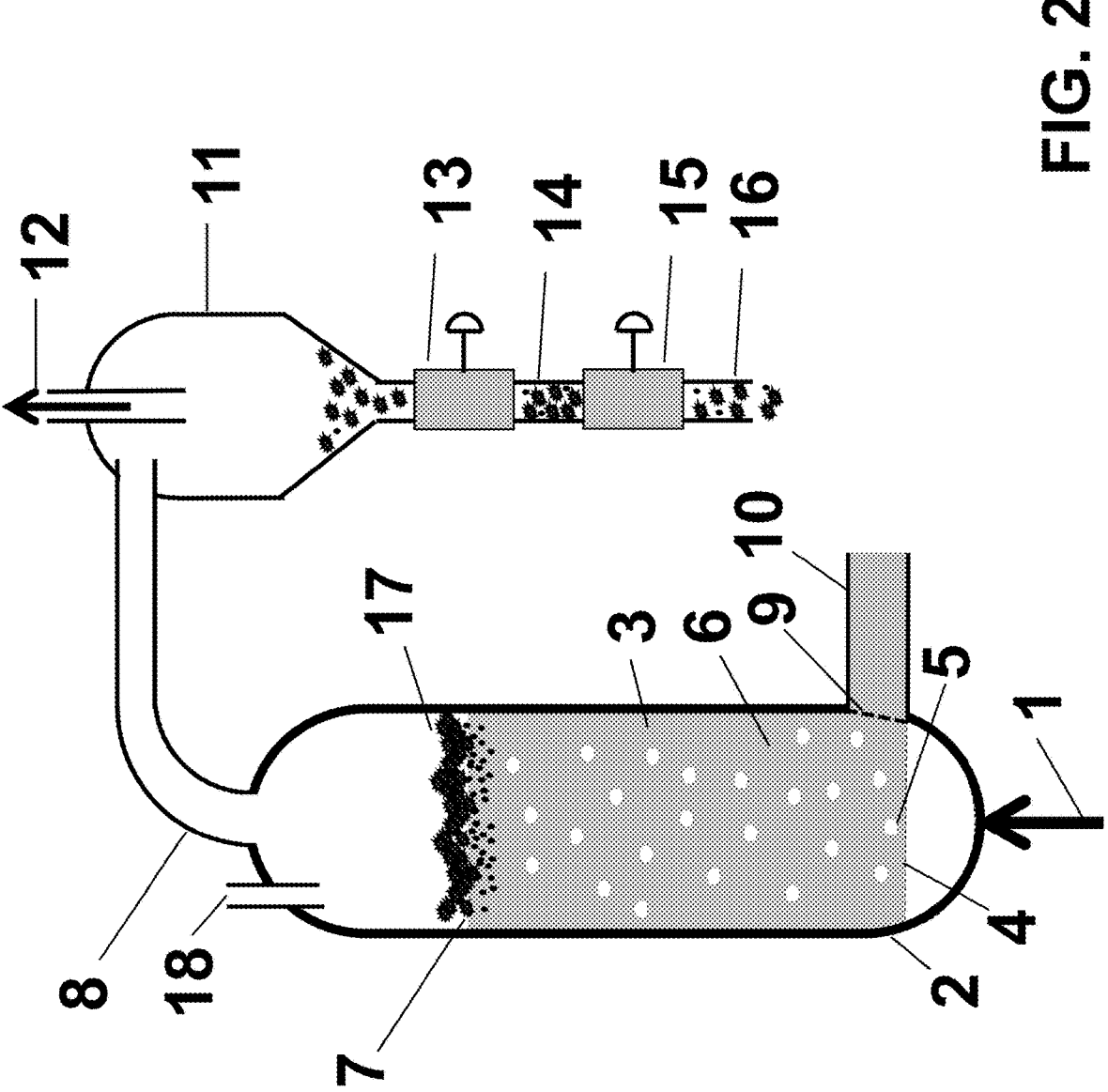
FIG. 2 is a schematic illustration showing a gas is introduced into a bubble column reactor containing a liquid and a solid product. The gas flow rate is kept sufficiently low to transport solid product to the liquid surface via floatation without inducing turbulent mixing. The solid product accumulates at the top of the vessel.

In order to separate the solid carbon remaining in the liquid reaction medium 3 in a semi-batch process, the hydrocarbon gas flow rate can be decreased to transition the bubble column from a churn-turbulent state (~20% holdup) to a bubbly flow state (~2-10% holdup, or about 5% holdup) as shown in FIG. 2. Based on the decreased turbulence, the solid carbon can migrate to the liquid reaction medium 3 surface via floatation. The solid carbon can coalesce to form a separated layer on the surface of the liquid reaction medium 3, even when some gas flow is still present through the reactor 2.

Figure 3:
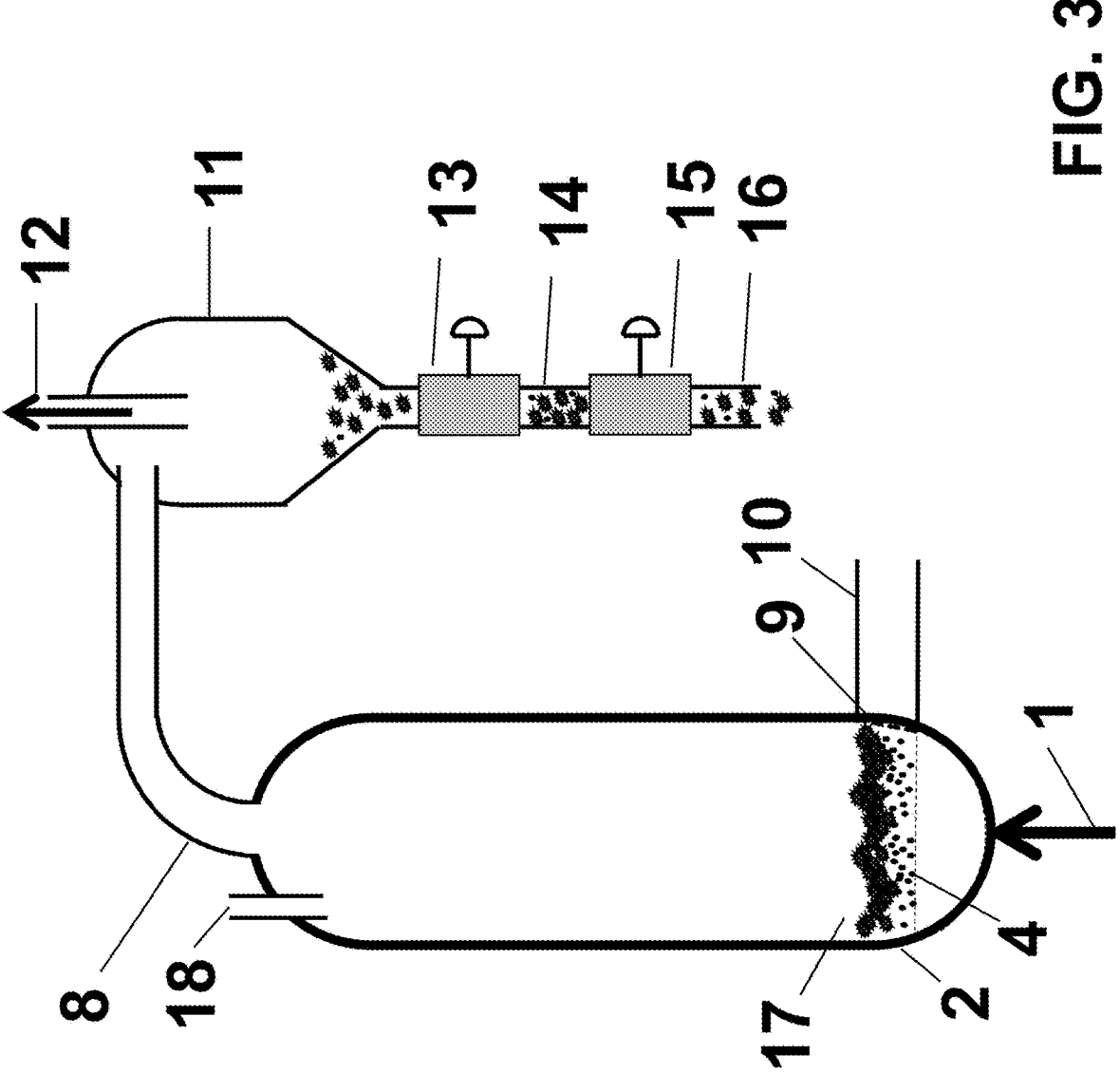
FIG. 3 is a schematic illustration showing liquid being drained from the reactor vessel through an orifice containing a filter. The solid product remains in the reactor vessel.

In step 3 (e.g., as shown in FIG. 3), the liquid media can be drained via the outlet or pipe located at the bottom of the reactor vessel 2. The liquid reaction medium 3 can be drained so as to leave the solid carbon layer within the reactor vessel 2. In some embodiments, a filter 9 or other device can be used within the reactor vessel 2 and/or within the drain conduit 10 to retain the solid carbon within the reactor vessel 2. For example, the filter 9 can comprise a porous ceramic structure arranged to allow the liquid reaction medium 3 to pass through while retaining the lighter carbon layer. In some embodiments, the solid carbon can be left to drain excess liquid reaction medium such as the liquid salt prior to moving to the carbon removal step.

Figure 4:
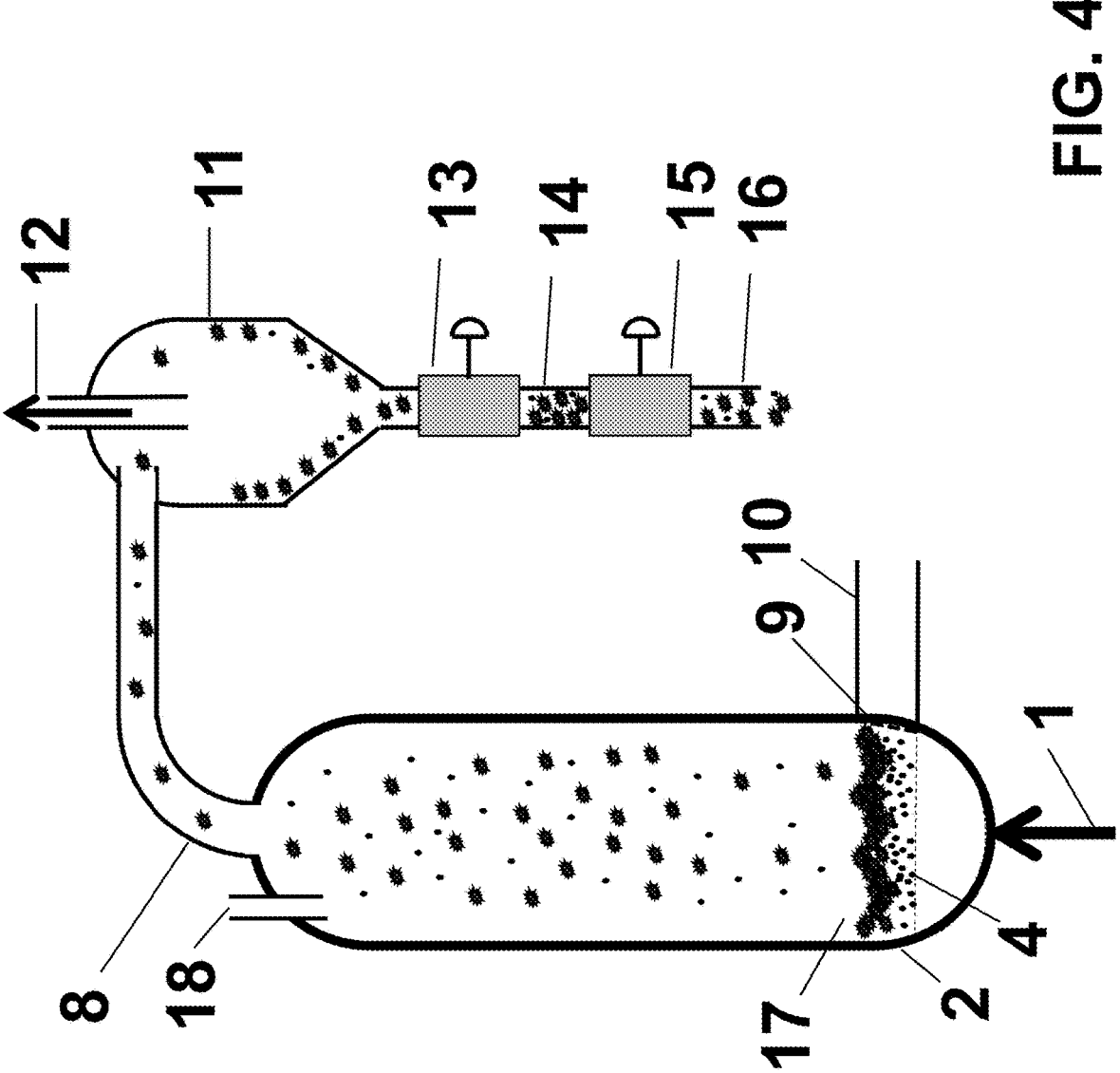
FIG. 4 is a schematic illustration showing gas being introduced in the bottom of the reactor vessel at a sufficient flow rate to pneumatically convey the solid. The solid is eluted out of the reactor vessel where it is subsequently separated from the gas stream with a cyclone. A sequence of two valves is used as a lock hopper to remove the solid from the high-pressure environment.

In step 4 (e.g., as shown in FIG. 4), the gas flow can be increased in the reactor to dry and pneumatically convey the carbon. The gas flow can comprise any suitable gas stream such as a gaseous product recycle stream, an inert gas, and/or a hydrocarbon gas. The gas flow rate can be selected to pneumatically convey the carbon to the gas outlet 8 via the orifice at the top of the reactor vessel 2. The gas and entrained carbon enter the cyclone separator 11 where the gas leaves the central vortex finder 12. The carbon exits the bottom of the cyclone where it is impeded by a valve 13. The carbon can be metered out of the first valve 13 and enter a lock hopper isolation chamber 14. The carbon can exit through the second valve 15 and leaves the system through an orifice 16. It should be understood that the solid can be removed from the gas stream outside of the reactor vessel 2 using any suitable gas/solid separator such as a cyclone separator, filters, settling chambers, or the like. Following removal of the solid carbon, molten media can be re-introduced into the reactor vessel and the cycle is repeated (e.g., moving back to the embodiment shown in FIG. 1A or 1B) to continue to produce gaseous products and solid carbon.

Figure 5A:
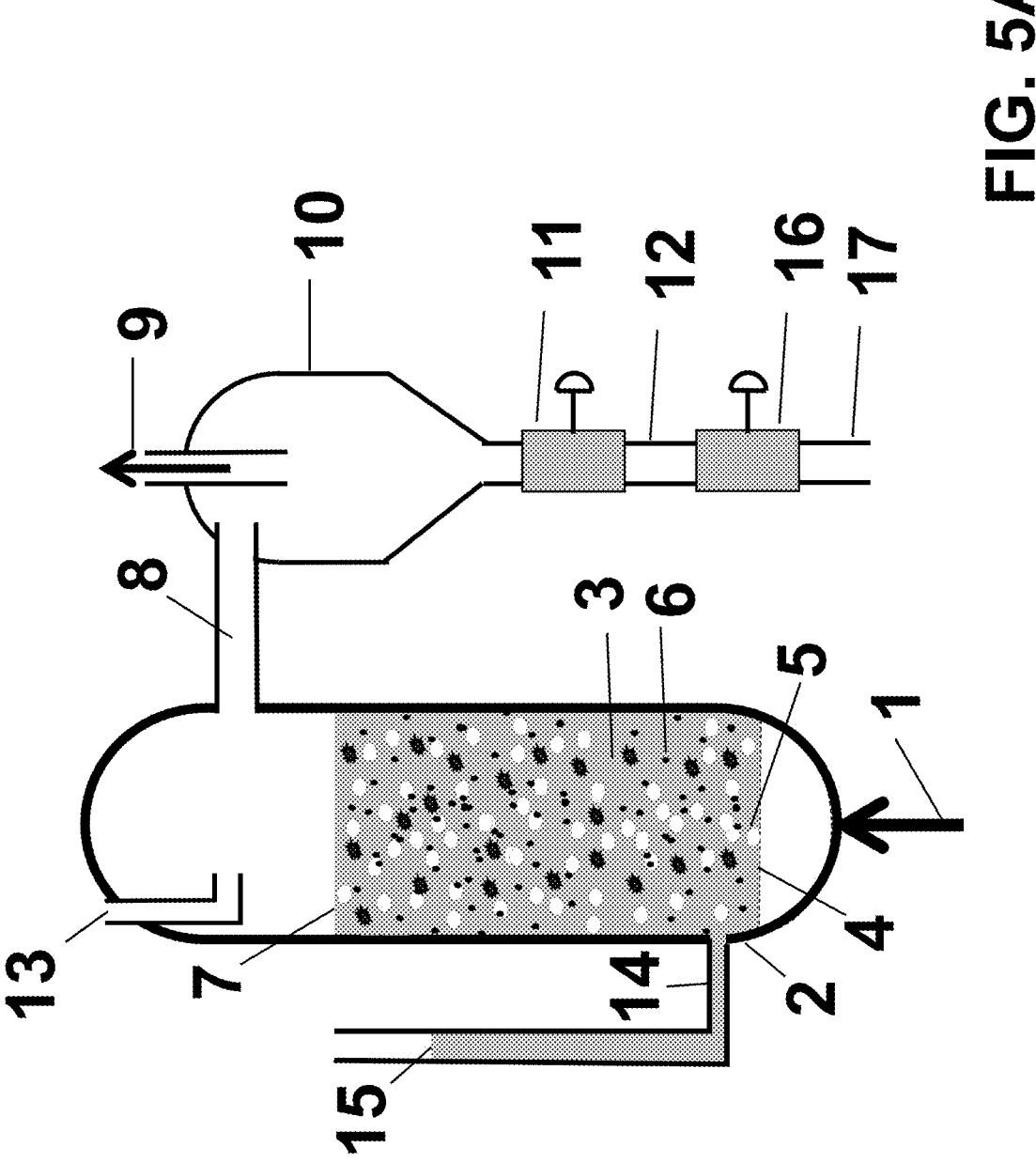
FIG. 5A is a schematic illustration showing a chemical reactant being introduced into a reactor containing a liquid and produces a solid product.
Figure 5B:
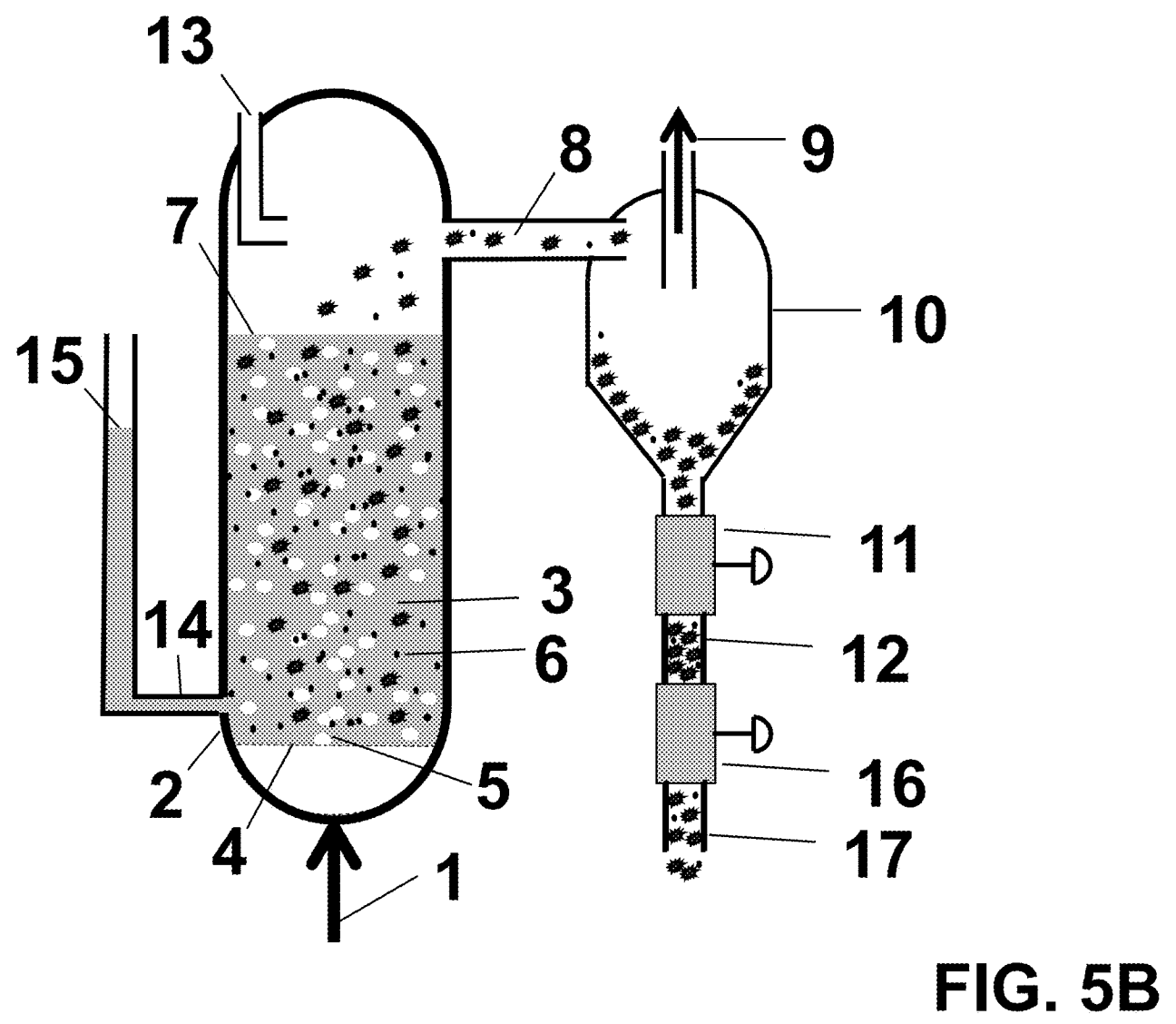

In some aspects, the process can be carried out using a single vessel, semi-batch flotation process with a pressure lift and pneumatic conveying of the solids. Reference is now made to FIGS. 5A-7. In this embodiment, the system can operate as a semi-batch process, with several steps repre-sented in FIGS. 5A/5B, 6, and 7, respectively. In step 1 (e.g., as shown in FIGS. 5A and/or 5B), a hydrocarbon gas 1 (e.g., methane, etc.) can be introduced into the reactor vessel 2 filled with a liquid reaction medium 3 (e.g., a molten salt. molten metal, solid salt, and/or solid metal) through the gas distributor 4 to form bubbles 5. The hydrocarbons within the hydrocarbon gas can be pyrolyzed to form solid carbon 6 and hydrogen gas. The hydrocarbon gas flowrate can be adjusted to attain a hold-up of between about 10% and about 40%, or approximately 20% during the reaction process. The hydrogen, unreacted hydrocarbons, and a portion of the solid carbon product can be disengaged at the liquid reaction medium surface 7 and exit through an gas outlet 8 at the top of the reactor vessel 2. The gas and entrained solids leaving the reactor can be transported to a cyclone 10 where the solid can be separated and the gas exits through the vortex finder 9. An inlet gas connection 13 can be located in the reactor vessel head space and can be used to flow additional gas such as an auxiliary gas stream 13 into the reactor to help remove the solid carbon, as described in more detail herein. As shown in FIG. 5A, the auxiliary gas stream 13 may not be used while the reaction is actively being carried out. Alternatively, as shown in FIG. 5B, the auxiliary gas stream 13 can be used during the reaction to carry at least a portion of the solid carbon out of the reactor during the reaction.

A side leg 14 can be connected to a bottom of the reactor vessel 2. The side leg 14 can contain stagnant liquid reaction medium 3. The pressure at the liquid reaction medium surface 15 in the side leg 14 can be controlled to adjust the liquid level in the reactor vessel. Further, the amount of the liquid reaction medium contained in the side leg 14 can be configured to allow for the liquid level within the reactor vessel 2 to be controlled within the desired level range.

Figure 6:
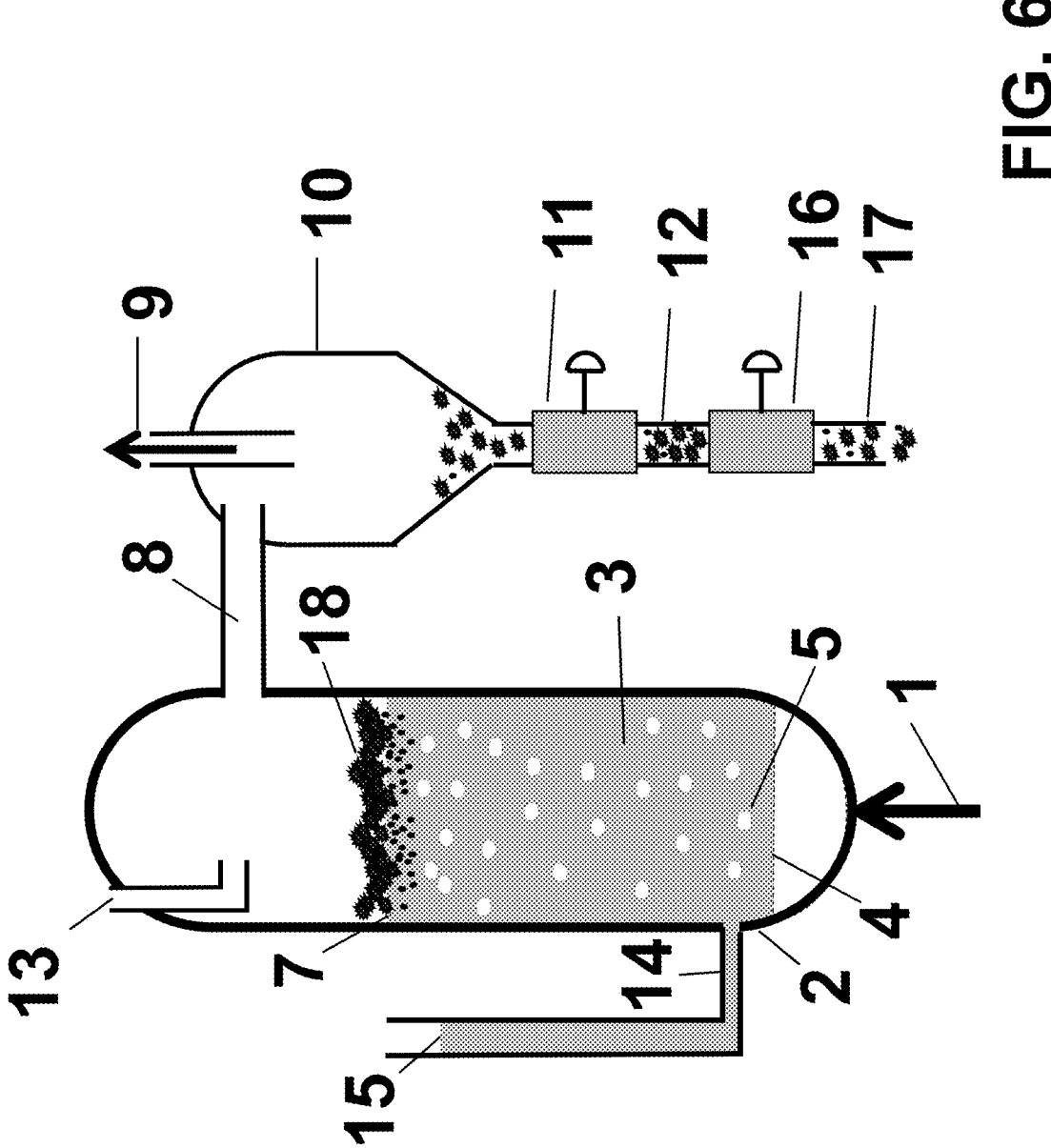
FIG. 6 is a schematic illustration showing a gas being introduced into a reactor containing a liquid and a solid product. The gas flow rate is kept sufficiently low to transport solid product remaining in the liquid to the liquid surface via floatation without inducing turbulent mixing. The solid product accumulates at the top of the vessel. The gas stream exits the reactor through an orifice at the top of the vessel. The gas stream passes through a cyclone separator and exits via the vortex finder. Another inlet orifice is located at the top of the reactor, but no gas is flowing in this process step. A side leg filled with stagnant liquid is present to modulate the liquid level in the reactor vessel.

In step 2 (e.g., as shown in FIG. 6), the hydrocarbon gas flow rate can be decreased to transition the bubble column to a bubbly flow state (e.g., reducing the hold-up percent-age). In the less-turbulent state, the solid carbon can migrate to the surface 7 of the liquid reaction medium 3 via floata-tion.

Figure 7:
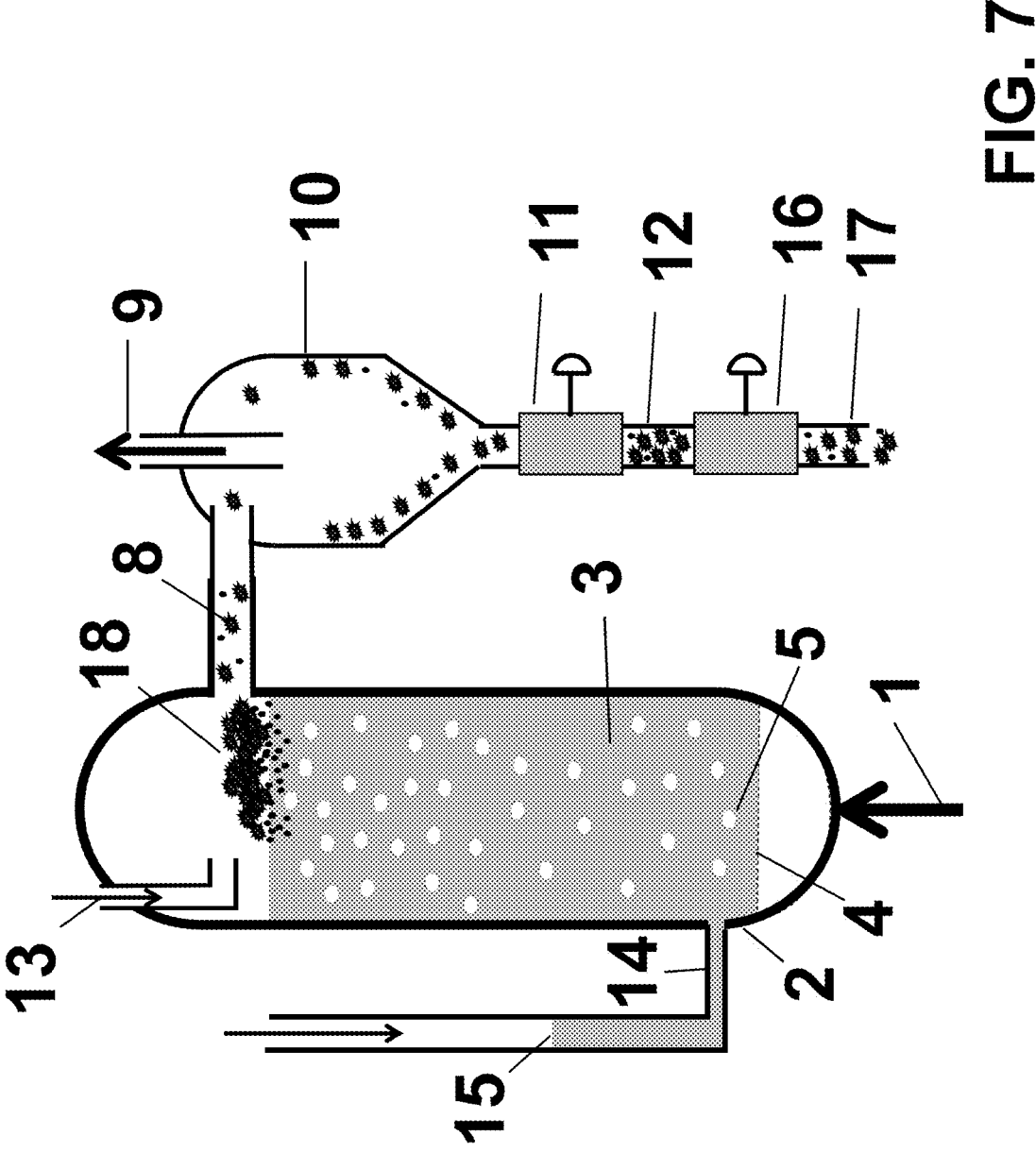
FIG. 7 is a schematic illustration showing a gas being introduced into a reactor containing a liquid and a solid product. The gas flow rate is kept sufficiently low to transport the solid product to the liquid surface via floatation without inducing turbulent mixing. The solid product accumulates at the top of the vessel. The gas pressure is increased in the side leg to raise the liquid level in the reactor vessel to a height near the gas exit orifice. Additional gas is introduced via the orifice at the top of the reactor to pneumatically convey the solid product. The solid is eluted out of the reactor vessel where it is subsequently separated from the gas stream with a cyclone. A sequence of two valves is used as a lock hopper to remove the solid from the high-pressure environment.

In step 3 (e.g., as shown in FIG. 7), the liquid level within the reactor can be modified using the pressure within the side leg 14. For example, a differential pressure between the gas head space in the reactor and the side leg can be used to transfer liquid reaction medium 3 from the side leg 14 into the reactor vessel 2, thereby bringing the floated carbon to a position where it can be pneumatically conveyed out of the reactor vessel 2.

Once the liquid reaction medium level has been raised, gas can be introduced via the gas connection 13 at the top of the reactor vessel 2 to aid in pneumatic conveying the solid carbon out of the reactor vessel 2. The exit orifice can be kept smaller than the reactor cross-sectional area to increase the gas velocity and further aid in the pneumatic conveyance of the solid carbon. The gas stream leaving the reactor vessel 2 can pneumatically convey the carbon. The gas and entrained carbon enter the cyclone separator 10 where the gas leaves the central vortex finder 9. The carbon exits the bottom of the cyclone where it is impeded by a valve 11. The carbon is metered out of the first valve 11 and enters a lock hopper isolation chamber 12. The carbon exits through the second valve 16 and leaves the system through an orifice 17. It should be understood that the solid can be removed from the gas stream outside of the reactor vessel 2 using any suitable gas/solid separator such as a cyclone, filter, settling chamber, or the like. Following removal of the solid carbon, the differential pressure in the side leg 14 can be adjusted to modulate the level of the liquid reaction medium in the reactor vessel 2 back to the necessary level for the main reaction to occur. It should be noted that the fluid level will be nearly static during the third step, whereas the fluid level will be rapidly oscillating during the main reaction process in the first step. The static fluid level can allow the pipe through which carbon is to exit the system to be horizontal or gently sloped while not allowing fluid to leave through the orifice. If carbon removal is attempted in step 1, the pipe angled to the horizontal would have to be increased to prevent liquid flow through the pipe.

Figure 8:
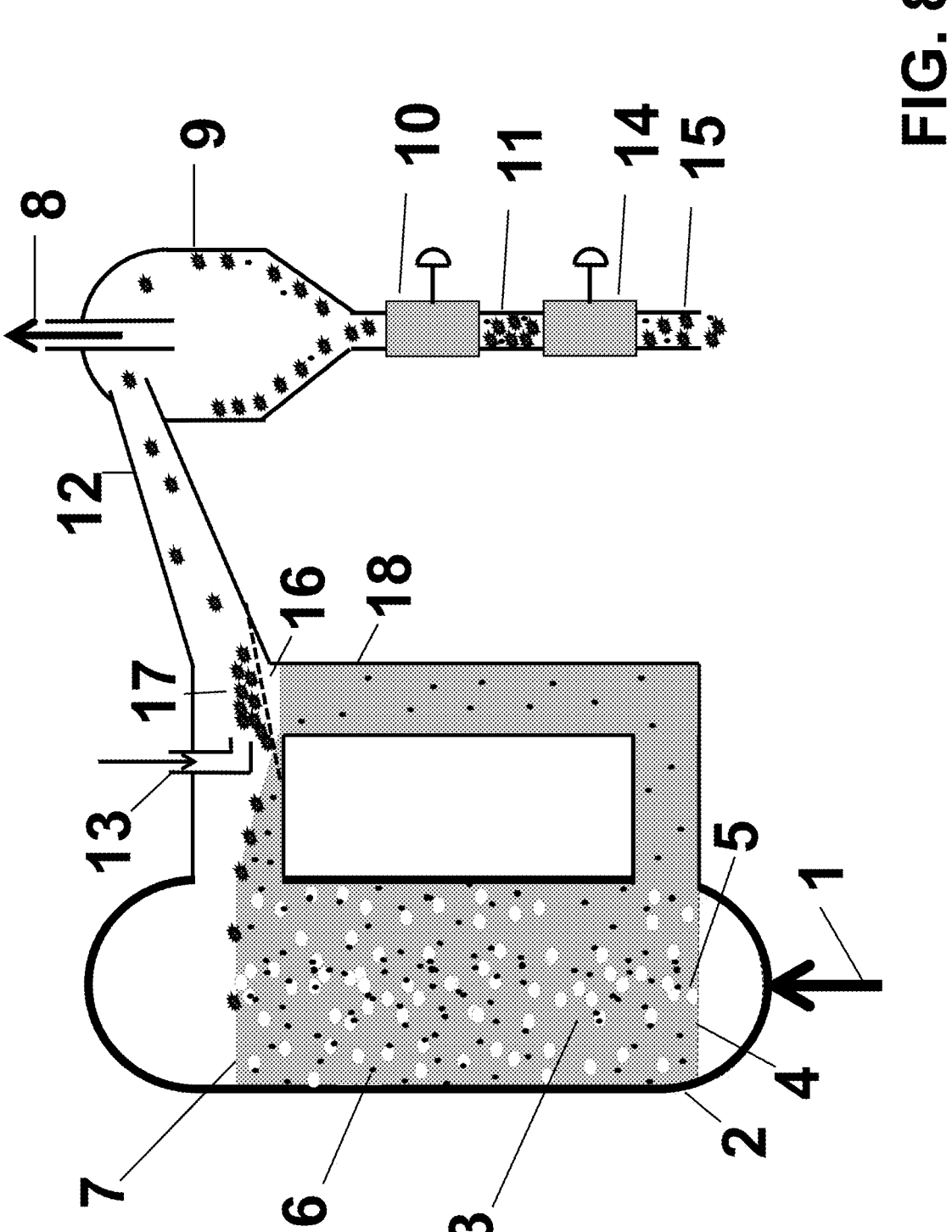
FIG. 8 is a schematic illustration showing a chemical reactant being introduced into a reactor containing a liquid and produces a solid product. The liquid and solid product flow through a side loop, where the solid is continuously removed via a metal or ceramic filter. The gaseous product, along with additional gas introduced via an orifice in the head space, flows over the filter and pneumatically conveys the solid product. The gas and solid leave through an orifice located in the side loop. The solid is eluted out of the reactor vessel where it is subsequently separated from the gas stream with a cyclone. A sequence of two valves is used as a lock hopper to remove the solid from the high-pressure environment.

In some aspects, the process can be carried out using a circulating loop configuration with continuous or semi-batch pneumatic conveying. Reference is made to FIG. 8. In this embodiment, a hydrocarbon gas 1 such as methane can be introduced into the reactor vessel 2, which can be filled with a liquid reaction medium 3 such as a molten salt and/or a molten metal through a gas distributor 4 to form bubbles 5. Within the reactor 2, the hydrocarbons in the hydrocarbon gas can be pyrolyzed to form solid carbon 6 and hydrogen gas. The hydrocarbon gas flowrate can be adjusted during the reaction process to form a turbulent flow regime, for example, by attaining a hold-up of between about 10% and about 40%, or approximately 20%. The hydrogen and unre-acted methane can be disengaged at the surface 7 of the liquid reaction medium 3. The liquid reaction medium 3 and carbon can leave the top of the reactor vessel to flow over a filter 16. The carbon 17 can accumulate on the filter. Additional gas can be introduced via the gas inlet 13 located in the head space above the filter. The additional gas can be a recycled product gas stream in some embodiments. The gas stream can pneumatically convey the carbon with the outlet gas so that the carbon and the product gas exit the system via the outlet 12. The filter and the exit conduit can be positioned at a slant to allow carbon conveyance with liquid reaction medium (e.g., liquid salt, liquid metal, etc.) drainage back into the reactor 2 for any entrained molten liquid medium 3.

In some embodiments, the outlet tube can narrow in the direction of material transport to increase the gas velocity and by extension the ability to pneumatically convey the carbon. The gas and entrained carbon enter the cyclone separator 9 where the gas leaves the central vortex finder 8. The carbon can exit the bottom of the cyclone where it is impeded by a valve 10. The carbon can be metered out of the first valve 10 and enter a lock hopper isolation chamber 11. The carbon can exit through the second valve 14 and leave the system through an orifice 15. It should be understood that the solid can be removed from the gas stream outside of the reactor vessel 2 using any suitable gas/solid separator such as a cyclone, filter, settling chamber, or the like. The liquid can return to the vessel through a downcomer pipe 18. The carbon removal from the filter can be performed con-tinuously or periodically. Periodic removal of carbon can be obtained by modulating or controlling the gas flow through the top inlet 13. Under low gas flow, the carbon can remain on the filter. When gas flow is increased, the carbon can be pneumatically conveyed in the gas and exit the system.

In some embodiments, a nozzle, jet, or other design can be used with a periodic removal to convey the carbon out of the reactor. While the top inlet 13 shows only a single inlet, a series of inlets or nozzles within the reactor can also be used to provide the gas flow to entrain and convey the solid carbon through the outlet.

Figure 9:
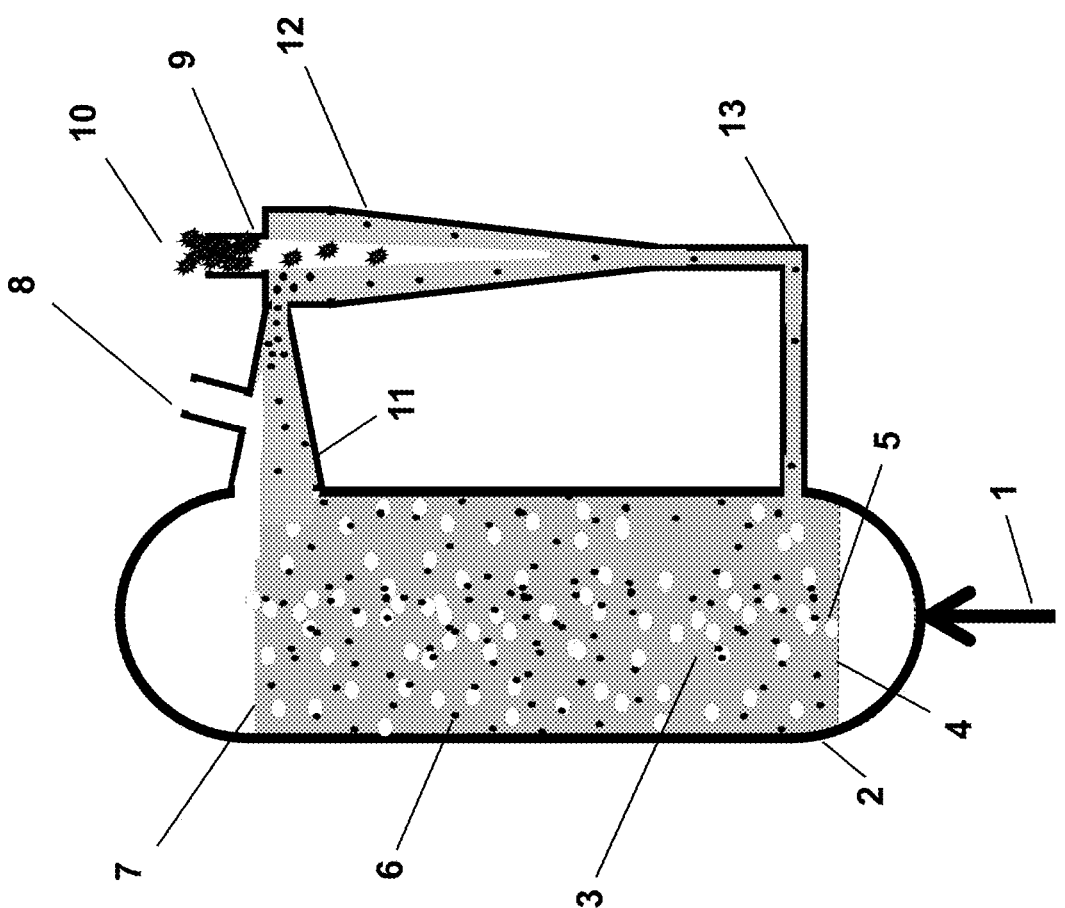
FIG. 9 is a schematic illustration showing a chemical reactant being introduced into a reactor containing a liquid and produces a solid product. Gaseous product leaves through an orifice at the top of the reactor vessel. Solid product accumulates in the liquid and the mixed stream leaves through an orifice located in the side loop. Solid is separated from the liquid via a cyclone.

In some aspects, a reverse cyclone configuration can be used. Reference is made to FIG. 9. In this embodiment, a hydrocarbon gas 1 such as methane can be introduced into the reactor vessel 2 filled with a liquid reaction medium 3 (e.g., molten salt and/or molten metal) through a gas distributor 4 to form bubbles 5. The hydrocarbon gas can be pyrolyzed to form solid carbon 6 and hydrogen gas. The hydrocarbon gas flowrate can be adjusted to attain turbulent mixing within the reactor. In some embodiments, the hydrocarbon gas flowrate can be adjusted to attain a hold-up of approximately 20%. The hydrogen and unreacted hydrocarbons can be disengaged at the surface 7 of the liquid reaction medium and exit through an outlet 8 at the top of the reactor vessel 2.

During the reaction process, fluid can circulate up the reactor 2, through a reducing section 11, down a reverse cyclone 12, and back to the reactor via a return stream 13. The reverse cyclone can serve to separate the liquid from the solid through differences in their density. In the reverse cyclone, a relatively solid rich stream can leave the top and a relatively fluid rich stream leaves the bottom. Within the reducing section 11, the liquid reaction medium and carbon slurry can form a seal such that the outlet gases do not enter the reverse cyclone 12. The solid carbon leaving the reverse cyclone can be further treated to remove any residual liquid reaction medium such as liquid salt.

In some configurations, a device can be used to help break up any solids formed in the reactor. Referring to FIGS. 10A-10E, a reactor assembly 31 can comprise two heated chambers or vessels: a reaction chamber 32, and a lift gas chamber 33. In some embodiments, the two chambers 32, 33 can be disposed within a single vessel with a pressure wall between the two chambers. The reaction and lift gas chambers can communicate via an orifice 34, which allows a fluid to flow between the two chambers and reach the same height in each chamber. In some embodiments, this fluid may be a molten metal and/or molten salt, for example, as part of a liquid reaction medium.

A hydrocarbon gas or feedstock can be introduced into the bottom of the reaction chamber 32 via an orifice 35, which can then decompose into a solid fraction (e.g., solid carbon) and a gaseous product (e.g., hydrogen gas, etc.). The gaseous fraction can exit the reaction chamber 32 via an outlet 36 with a portion of the solid product, while a portion of the solid remains dispersed within the liquid reaction medium in the reaction chamber 32. After a period of operation, the fluid can become saturated with the solid products. At this point, introduction of the hydrocarbon feedstock can be reduced or altogether ceased. This allows the solid fraction, which is less dense than the fluid fraction, to float to the top of the liquid reaction medium where it is allowed to sit for a period of time so that any fluid contained within the solid fraction can drain out of the solid fraction. The temperature of the reaction chamber may be adjusted during this time to assist with this process (e.g., being heated to maintain the liquid reaction medium in the liquid phase, etc.). The lift chamber 33 can then be pressurized via the introduction of a lift gas via the lift gas inlet 37, which can raise the fluid level within the reaction chamber 32 via fluid transfer through orifice 34. This forces the solid fraction 38 through the first of one or more sharp grates 39, 40 which breaks up the solid fraction floating on the liquid reaction medium. When more than one grate is present, the additional grates 40 can be offset from the other grates and/or contain finer spacing. This may further break up the solid fraction as it lifted through the grates by the rising fluid.

When the solid fraction reaches the height of the outlet 36, a pressurized gas can be introduced through a gas inlet 42, which enters the reaction chamber via a nozzle 41. The solid material can then be entrained in the pressurized gas and leaves the reaction chamber via the outlet 36. Once at least a portion of the solid fraction has been removed, the lift chamber can then be depressurized via the lift gas inlet 37 until the fluid level is the same in both reaction chambers 32, 33. With the portion of the solid material removed, the process can then be repeated.

In some configurations, the bottoms of the two chambers may be slanted, and a drain 43 may be positioned near the lowest point in order to allow the fluid to be drained from both chambers.

In some configurations, the lift gas inlet 37 may connect directly to a third chamber, which sits inside a heated vessel whose temperature can be adjusted independently of the temperature of the reaction and lift gas chambers. The pressure within the lift gas chamber 33 can then be adjusted by changing the temperature of this third chamber, so that no valves are necessary in order to control the fluid height in the reaction chamber 32.

Figure 10B:
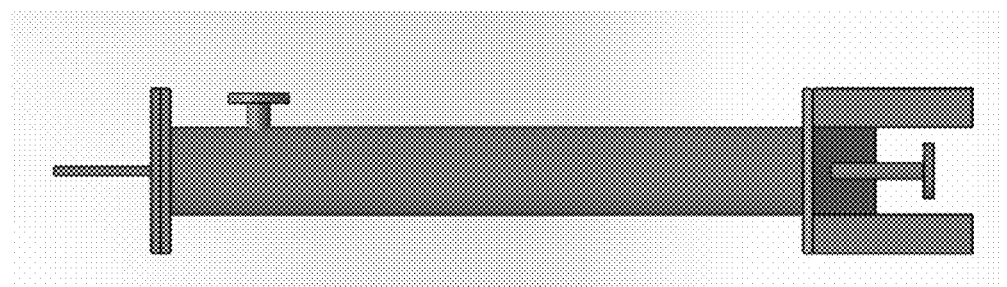
FIGS. 10A-10E illustrate various reactor configurations for a molten liquid reactor.
Figure 10A:
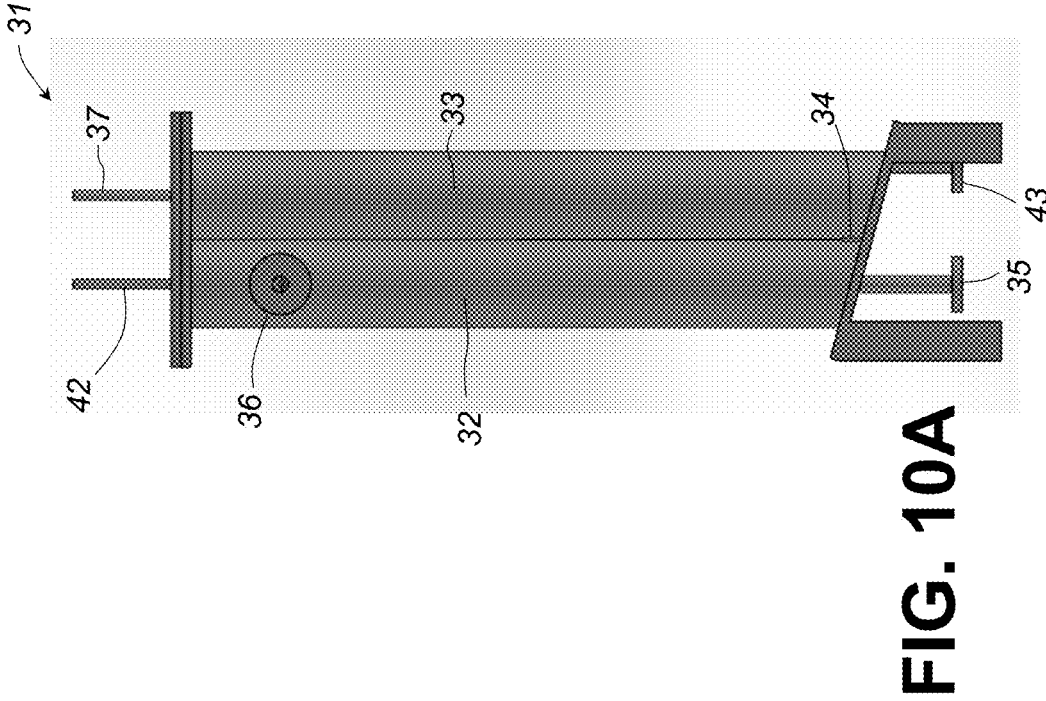
Figure 10D:
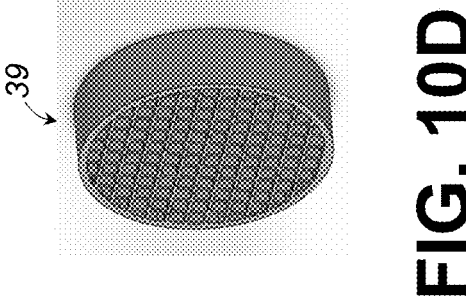
Figure 10C:
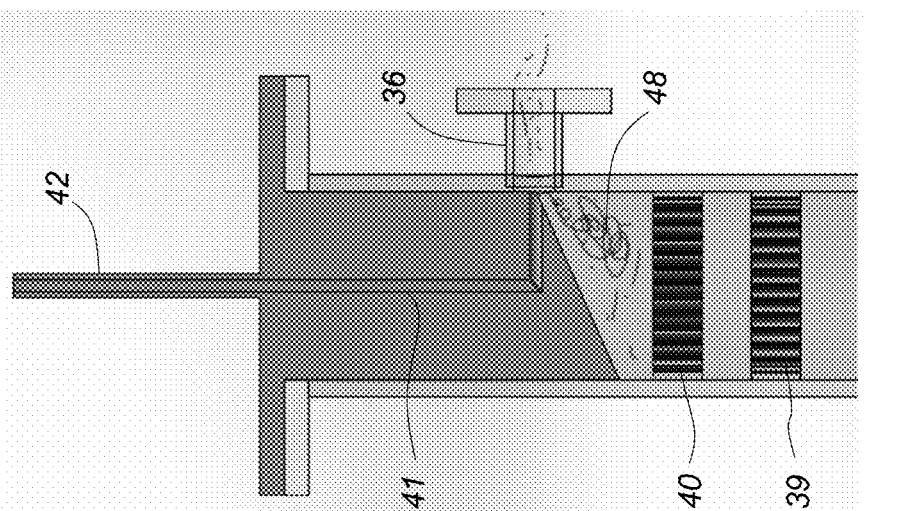
Figure 10E:
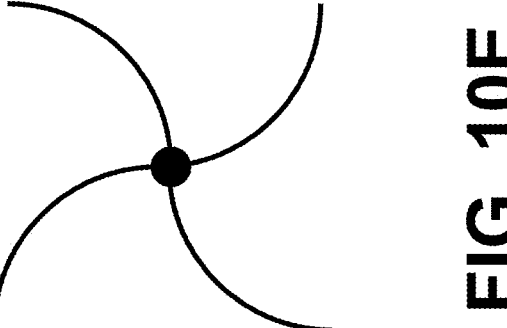

In some embodiments, additional structures can be placed within the reaction chamber 32 above the one or more grates 39, 40 to aid in breaking up the solid fraction and allowing the gas to entrain the solid fraction. FIG. 10E illustrates a spinner or rake that can be rotationally mounted within the reaction chamber 32. The gas passing through the gas inlet and nozzle 41 can be configured to impinge on the spinner to cause the spinner to rotate within the reaction chamber 32. The rotational motion can break up the solid fraction to produce smaller portions that can be more easily entrained within the gas flow. The spinner can also serve to move the solid fraction pieces towards the outlet 36. While shown as having a cross-section that can be mounted within the chamber, the spinner can also be mounted along the main axis of the reactor such that the spinner can rotate horizontally. Other embodiments can include helical structures, blades, and the like that can be transversely or axially mounted within the reaction chamber 32 to rotate when gas passes through the nozzle 41.

Having described various systems and methods, certain aspects can include, but are not limited to:

In a first aspect, a process comprises: introducing chemical reactants into a reactor containing a liquid maintained at a high temperature; producing chemical products in the liquid, wherein the chemical products comprise a solid chemical product that is mixed with the liquid; allowing the solid product to grow in particle size; accumulating the solid product in the liquid; and removing the solid product from the reactor.

A second aspect can include the process of the first aspect, wherein the chemical reactants are molecules containing carbon and hydrogen, including but not limited to, natural gas components, oil components, biomass, and polymers.

A third aspect can include the process of the first or second aspect, wherein the reactor is a bubble column.

A fourth aspect can include the process of any one of the first to third aspects, wherein the temperature is between 400° C. and 1500° C. and the pressure between 1 bar and 40 bar.

A fifth aspect can include the process of any one of the first to fourth aspects, wherein the liquid is a molten salt, a molten metal, or a combination of a molten salt and a molten metal.

A sixth aspect can include the process of any one of the second to fifth aspects, wherein the carbon and hydrogen containing reactants are decomposed to form solid carbon, wherein the solid carbon aggregates and grows within the liquid to form particles greater than 1 micrometer in size.

A seventh aspect can include the process of any one of the first to sixth aspects, wherein the solid particles accumulate on the top of the liquid surface via floatation with a bubbling gas.

An eighth aspect can include the process of any one of the first to seventh aspects, wherein the solid accumulates on the top of the liquid, and wherein the solid is removed from the system via pneumatic conveyance in a gas stream.

A ninth aspect can include the process of any one of the first to eighth aspects, wherein the liquid level in the reactor is modulated by changing a pressure in an attached side leg.

A tenth aspect can include the process of any one of the first to ninth aspects, wherein the solid product accumulates on a filter and is removed from the filter via pneumatic conveying.

An eleventh aspect can include the process of any one of the first to tenth aspects, wherein the liquid and solid particles are transported to another vessel for solid separation.

A twelfth aspect can include the process of any one of the first to eleventh aspects, wherein an auxiliary gas stream is introduced to aid in the conveying of the solid particles out of the reactor.

In a thirteenth aspect, a method comprises: introducing a hydrocarbon reactant into a reactor, wherein the reactor comprises a liquid reaction medium; forming solid carbon within the reactor based on contacting the hydrocarbon reactant with the liquid reaction medium; ceasing the hydrocarbon reactant introduction into the reactor; separating the solid carbon from the liquid reaction medium after ceasing the hydrocarbon reactant introduction into the reactor; draining the liquid reaction medium from the reactor; and pneumatically conveying the solid carbon within the reactor.

A fourteenth aspect can include the method of the thirteenth aspect, further comprising: removing the entrained solid carbon from the reactor in a pneumatically conveying gas stream.

A fifteenth aspect can include the method of the fourteenth aspect, further comprising: separating the solid carbon from the pneumatically conveying gas stream.

A sixteenth aspect can include the method of the thirteenth aspect, further comprising: accumulating the solid carbon on a filter when draining the liquid reaction medium from the reactor.

A seventeenth aspect can include the method of any one of the thirteenth to sixteenth aspects, wherein the hydrocarbon reactant comprises molecules containing carbon and hydrogen, including but not limited to, natural gas components, oil components, biomass, and polymers.

An eighteenth aspect can include the method of any one of the thirteenth to seventeenth aspects, wherein the reactor is a bubble column.

A nineteenth aspect can include the method of any one of the thirteenth to eighteenth aspects, wherein a temperature in the reactor is between 400° C. and 1500° C. and a pressure is between 1 bar and 40 bar.

A twentieth aspect can include the method of any one of the thirteenth to nineteenth aspects, wherein the liquid reaction medium comprises a molten salt, a molten metal, or a combination of a molten salt and a molten metal.

A twenty first aspect can include the method of any one of the thirteenth to twentieth aspects, wherein the solid carbon aggregates and grows within the liquid reaction medium to form particles greater than 1 micrometer in size.

A twenty second aspect can include the method of any one of the thirteenth to twenty first aspects, wherein the solid carbon accumulates on the top of the liquid reaction medium via floatation with a bubbling gas.

A twenty third aspect can include the method of any one of the thirteenth to twenty second aspects, wherein the liquid level in the reactor is modulated by changing a pressure in an attached side leg.

A twenty fourth aspect can include the method of any one of the thirteenth to twenty third aspects, wherein the liquid and solid particles are transported to another vessel for solid separation.

In a twenty fifth aspect, a method comprises: introducing a hydrocarbon reactant into a reactor at a first rate, wherein the reactor comprises a liquid reaction medium; forming solid carbon within the reactor based on contacting the hydrocarbon reactant with the liquid reaction medium; reducing the hydrocarbon reactant introduction into the reactor to a second rate; separating the solid carbon from the liquid reaction medium after reducing the hydrocarbon reactant introduction to the second rate; raising a level of the liquid reaction medium within the reactor; and pneumatically conveying the solid carbon within the reactor.

A twenty sixth aspect can include the method of the twenty fifth aspect, wherein raising the level of the liquid reaction medium comprises raising the solid carbon separated on top of the liquid reaction medium to at or near an outlet of the reactor.

A twenty seventh aspect can include the method of the twenty fifth or twenty sixth aspect, wherein raising the level of the liquid reaction medium comprises: increasing a pressure on the liquid reaction medium in a side leg in fluid communication with the reactor; displacing the liquid reaction medium in the side leg into the reactor; and raising the level of the liquid reaction medium within the reactor based on displacing the liquid reaction medium in the side leg into the reactor.

A twenty eighth aspect can include the method of any one of the twenty fifth to twenty seventh aspects, wherein pneumatically conveying the solid carbon within the reactor comprises: injecting a pneumatically conveying fluid into the reactor above the liquid reaction medium; and pneumatically conveying the solid carbon on top of the liquid reaction medium with the pneumatically conveying fluid.

A twenty ninth aspect can include the method of the twenty eighth aspect, wherein the pneumatically conveying fluid is injected into the reactor through a nozzle.

A thirtieth aspect can include the method of the twenty ninth aspect, wherein the nozzle is disposed adjacent a fluid outlet of the reactor.

A thirty first aspect can include the method of any one of the twenty seventh to thirtieth aspects, further comprising: removing the pneumatically conveyed solid carbon from the reactor in a pneumatically conveying fluid stream.

A thirty second aspect can include the method of the thirty first aspect, further comprising: separating the solid carbon from the pneumatically conveying gas stream.

A thirty third aspect can include the method of any one of the twenty seventh to thirty second aspects, wherein a spinner is disposed above the liquid reaction medium, and wherein the method further comprises: rotating the spinner based on contacting at least a portion of the spinner with the pneumatically conveying fluid; and breaking apart the solid carbon based on the rotation of the spinner.

A thirty fourth aspect can include the method of any one of the twenty fifth to thirty third aspects, wherein the reactor comprises one or more grates disposed within the reactor, and wherein the method further comprises: raising the solid carbon through the one or more grates when raising the level of the liquid reaction medium; and breaking apart the solid carbon based on raising the solid carbon through the one or more grates.

A thirty fifth aspect can include the method of any one of the twenty fifth to thirty fourth aspects, wherein the hydrocarbon reactant comprises molecules containing carbon and hydrogen, including but not limited to, natural gas components, oil components, biomass, and polymers.

A thirty sixth aspect can include the method of any one of the twenty fifth to thirty fifth aspects, wherein the reactor is a bubble column.

A thirty seventh aspect can include the method of any one of the twenty fifth to thirty sixth aspects, wherein a temperature in the reactor is between 400° C. and 1500° C. and a pressure is between 1 bar and 40 bar.

A thirty eighth aspect can include the method of any one of the twenty fifth to thirty seventh aspects, wherein the liquid reaction medium comprises a molten salt, a molten metal, or a combination of a molten salt and a molten metal.

A thirty ninth aspect can include the method of any one of the twenty fifth to thirty eighth aspects, wherein the solid carbon aggregates and grows within the liquid reaction medium to form particles greater than 1 micrometer in size.

A fortieth aspect can include the method of any one of the twenty fifth to thirty ninth aspects, wherein the solid carbon accumulates on the top of the liquid reaction medium via floatation with a bubbling gas.

A forty first aspect can include the method of any one of the twenty fifth to fortieth aspects, wherein the liquid level in the reactor is modulated by changing a pressure in an attached side leg.

A forty second aspect can include the method of any one of the twenty fifth to forty first aspects, wherein the liquid and solid particles are transported to another vessel for solid separation.

In a forty third aspect, a method comprises: introducing a hydrocarbon reactant into a reactor, wherein the reactor comprises a liquid reaction medium, and wherein the reactor comprises a main reaction section, a side leg, an upper connection between the main reaction section and the side leg, and a lower connection between the main reaction section and the side leg; forming solid carbon within the main reaction section based on contacting the hydrocarbon reactant with the liquid reaction medium; flowing the liquid reaction medium and at least a portion of the solid carbon through the upper connection; separating the solid carbon from the liquid reaction medium on a grate in the upper connection; and pneumatically conveying the solid carbon on the grate to remove the solid carbon from the reactor.

A forty fourth aspect can include the method of the forty third aspect, further comprising: removing the pneumatically conveyed solid carbon from the reactor using a pneumatically conveying gas stream.

A forty fifth aspect can include the method of the forty fourth aspect, further comprising: separating the solid carbon from the pneumatically conveying gas stream.

A forty sixth aspect can include the method of any one of the forty third to forty fifth aspects, wherein the hydrocarbon reactant comprises molecules containing carbon and hydrogen, including but not limited to, natural gas components, oil components, biomass, and polymers.

A forty seventh aspect can include the method of any one of the forty third to forty sixth aspects, wherein the reactor is a bubble column.

A forty eighth aspect can include the method of any one of the forty third to forty seventh aspects, wherein a temperature in the reactor is between 400° C. and 1500° C. and a pressure is between 1 bar and 40 bar.

A forty ninth aspect can include the method of any one of the forty third to forty eighth aspects, wherein the liquid reaction medium comprises a molten salt, a molten metal, or a combination of a molten salt and a molten metal.

A fiftieth aspect can include the method of any one of the forty third to forty ninth aspects, wherein the solid carbon aggregates and grows within the liquid reaction medium to form particles greater than 1 micrometer in size.

A fifty first aspect can include the method of any one of the forty third to fiftieth aspects, wherein the solid carbon accumulates on the top of the liquid reaction medium via floatation with a bubbling gas.

A fifty second aspect can include the method of any one of the forty third to fifty first aspects, wherein the liquid level in the reactor is modulated by changing a pressure in an attached side leg.

A fifty third aspect can include the method of any one of the forty third to fifty second aspects, wherein the liquid and solid particles are transported to another vessel for solid separation.

In a fifty fourth aspect, a method comprises: introducing a hydrocarbon reactant into a reactor, wherein the reactor comprises a liquid reaction medium, and wherein the reactor comprises a main reaction section, a side leg, an upper connection between the main reaction section and the side leg, and a lower connection between the main reaction section and the side leg, wherein the side leg comprises a reverse cyclone; forming solid carbon within the main reaction section based on contacting the hydrocarbon reactant with the liquid reaction medium; flowing the liquid reaction medium and at least a portion of the solid carbon through the upper connection; separating the solid carbon from the liquid reaction medium in the reverse cyclone; and removing the solid carbon from the reactor through an exit in the reverse cyclone.

A fifty fifth aspect can include the method of the fifty fourth aspect, further comprising: returning liquid reaction medium from the reverse cyclone to the reactor through the lower connection.

A fifty sixth aspect can include the method of the fifty fourth or fifty fifth aspect, further comprising: removing a gas stream from the reactor through a gas outlet in a top of the reactor.

A fifty seventh aspect can include the method of any one of the fifty fourth to fifty sixth aspects, wherein the hydrocarbon reactant comprises molecules containing carbon and hydrogen, including but not limited to, natural gas components, oil components, biomass, and polymers.

A fifty eighth aspect can include the method of any one of the fifty fourth to fifty seventh aspects, wherein the reactor is a bubble column.

A fifty ninth aspect can include the method of any one of the fifty fourth to fifty eighth aspects, wherein a temperature in the reactor is between 400° C. and 1500° C. and a pressure is between 1 bar and 40 bar.

A sixtieth aspect can include the method of any one of the fifty fourth to fifty ninth aspects, wherein the liquid reaction medium comprises a molten salt, a molten metal, or a combination of a molten salt and a molten metal.

A sixty first aspect can include the method of any one of the fifty fourth to sixtieth aspects, wherein the solid carbon aggregates and grows within the liquid reaction medium to form particles greater than 1 micrometer in size.

A sixty second aspect can include the method of any one of the fifty fourth to sixty first aspects, wherein the solid carbon accumulates on the top of the liquid reaction medium via floatation with a bubbling gas.

A sixty third aspect can include the method of any one of the fifty fourth to sixty second aspects, wherein the liquid level in the reactor is modulated by changing a pressure in an attached side leg.

A sixty fourth aspect can include the method of any one of the fifty fourth to sixty third aspects, wherein the liquid and solid particles are transported to another vessel for solids separation.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although claims may be formulated in this application or of any further application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicant(s) hereby give notice that new claims may be formulated to such features and/or combinations of such features during the prosecution of the present Application or of any further Application derived therefrom.

What is claimed is:

1. A pyrolysis process comprising:
   introducing one or more chemical reactants into a reactor containing a liquid maintained at a high temperature, wherein the one or more chemical reactants are molecules containing carbon and hydrogen;
   producing chemical products in the liquid based on the high temperature, wherein the chemical products comprise a solid product that is mixed with the liquid;
   allowing the solid product to grow in particle size;
   accumulating the solid product in the liquid;
   pneumatically conveying the solid product from the reactor, while retaining a substantial portion of the liquid within the reactor, via a gas stream introduced into a head space of the reactor;
   separating the solid product from the liquid reaction medium on a grate in an upper connection of the reactor; and
   pneumatically conveying the solid product from the grate to remove the solid product from the reactor.

2. The process of claim 1, wherein the reactor is a bubble column.

3. The process of claim 1, wherein the high temperature is between 400° C. and 1500° C.

4. The process of claim 1, wherein the liquid is a molten salt, a molten metal, or a combination of a molten salt and a molten metal.

5. The process of claim 1, wherein the carbon and hydrogen containing reactants are decomposed to form solid carbon, wherein the solid carbon aggregates and grows within the liquid to form particles greater than 1 micrometer in size.

6. The process of claim 1, further comprising: accumulating the solid product on the top of the liquid surface via flotation.

7. The process of claim 1, further comprising: using a filter to separate the solid product from the liquid.

8. The process of claim 1, wherein pneumatically conveying the solid product from the reactor comprises: introducing an auxiliary gas stream into the reactor to convey the solid product out of the reactor.

9. The process of claim 1, wherein pneumatically conveying the solid product from the reactor comprises:

entraining the solid product in a pneumatically conveying gas stream; and removing the solid product from the reactor based on the entraining.

10. The process of claim 7, further comprising:

separating the solid product from the pneumatically conveying gas stream.

11. The process of claim 1, wherein the reactor comprises a main reaction section, a side leg, the upper connection between the main reaction section and the side leg, and a lower connection between the main reaction section and the side leg.

12. The process of claim 1, further comprising:

flowing the liquid reaction medium and at least a portion of the solid product through the upper connection.

13. The process of claim 1, further comprising:

separating the solid product from the pneumatically conveying gas stream.

14. A pyrolysis system comprising:

chemical reactants, wherein the chemical reactants comprise molecules containing carbon and hydrogen;

a reactor comprising a molten liquid;

chemical products disposed in the molten liquid, wherein the chemical products comprise a solid product that is mixed with the liquid;

a gas stream inlet disposed in the reactor, wherein the gas stream inlet is configured to pneumatically convey the solid product from the reactor using a gas stream while retaining a substantial portion of the liquid within the reactor; and a grate disposed in an upper connection of the reactor; wherein the gas stream inlet is configured to pneumatically convey the solid product from the grate to remove the solid product from the reactor.

15. The system of claim 14, wherein the molten liquid is a molten salt, a molten metal, or a combination of a molten salt and a molten metal.

16. The system of claim 14, wherein the solid product comprises carbon particles greater than 1 micrometer in size.

17. The system of claim 14, wherein the solid product is disposed on the top of the molten liquid surface.

18. The system of claim 14, further comprising: a filter configured to separate the solid product from the molten liquid.

19. The system of claim 14, further comprising:

a separator in fluid communication with the reactor, wherein the separator is configured to receive the gas stream with the solid product and separate the solid product from the pneumatically conveying gas stream.

20. The system of claim 14, wherein the reactor is a bubble column.

21. The system of claim 14, wherein the reactor comprises a main reaction section, a side leg, the upper connection between the main reaction section and the side leg, and a lower connection between the main reaction section and the side leg.

* * * * *